United States Patent
Brezina et al.

(10) Patent No.: US 6,666,589 B2
(45) Date of Patent: Dec. 23, 2003

(54) INTERNAL EMI SHIELD FOR MULTIPLE ARRAY OPTOELECTRONIC DEVICES

(75) Inventors: Johnny R. Brezina, Austin, TX (US); Brian M. Kerrigan, Austin, TX (US); Gerald D. Malagrino, Jr., Rochester, MN (US); James R. Moon, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 10/006,834

(22) Filed: Nov. 5, 2001

(65) Prior Publication Data

US 2003/0103736 A1 Jun. 5, 2003

(51) Int. Cl.$^7$ ................................................. G02B 6/36
(52) U.S. Cl. .............................. 385/92; 385/89; 385/93; 385/94
(58) Field of Search .............................. 385/92, 88, 89, 385/94, 52, 24, 14, 49, 93, 33

(56) References Cited

U.S. PATENT DOCUMENTS

| | | | |
|---|---|---|---|
| 4,198,119 A | 4/1980 | Uberbacher | 385/55 |
| 4,218,113 A | 8/1980 | Uberbacher | 385/55 |
| 4,373,778 A | 2/1983 | Adham | |
| 4,458,985 A | 7/1984 | Balliet et al. | |
| 4,553,813 A | 11/1985 | McNaughton et al. | |
| 4,598,974 A | 7/1986 | Munn et al. | |
| 4,934,778 A | 6/1990 | Gillett | |
| 5,093,879 A | 3/1992 | Bregman et al. | 385/93 |
| 5,202,943 A | 4/1993 | Carden et al. | 385/92 |
| 5,315,679 A | 5/1994 | Baldwin et al. | 385/76 |
| 5,329,604 A | 7/1994 | Baldwin et al. | 385/92 |
| 5,333,225 A | 7/1994 | Jacobowitz et al. | 385/93 |
| 5,337,388 A | 8/1994 | Jacobowitz et al. | 385/76 |
| 5,396,573 A | 3/1995 | Ecker et al. | 385/88 |
| 5,499,311 A | 3/1996 | DeCusatis | 385/89 |
| 5,729,644 A | 3/1998 | Shiflett et al. | 385/59 |
| 6,062,738 A | 5/2000 | Braquet et al. | 385/59 |
| 6,085,006 A | 7/2000 | Gaio et al. | 385/92 |
| 6,200,041 B1 | 3/2001 | Gaio et al. | 385/92 |
| 6,201,704 B1 | 3/2001 | Poplawski et al. | 361/753 |
| 6,510,262 B2 * | 1/2003 | Gallup et al. | 385/33 |

OTHER PUBLICATIONS

U.S. patent application entitled "External EMI Shield for Multiple Array Optoelectronic Devices", (Inventors Johnny R. Brezina, et al.).
U.S. patent application entitled "Multiple Array Optoelectronic Connector with Integrated Latch", (Inventors Johnny R. Brezina, et al.).
U.S. patent application entitled, "Fiber Optic tranceiver, Connector, And Method of Dissipating Heat", (Inventors Johnny R. Brezina, et al.).

* cited by examiner

*Primary Examiner*—Phan T. H. Palmer
(74) *Attorney, Agent, or Firm*—Cardinal Law Group; Casimer K. Salys

(57) ABSTRACT

An optical fiber link module adapted to receive a fiber optic cable. The optical fiber link module comprises a multiple array lens and a female connector. The female connector is disposed around the multiple array lens, and has an internal cavity. An electromagnetic shield is disposed in the internal cavity, and has a single central aperture sized to permit communication by the multiple array lens through the central aperture.

20 Claims, 2 Drawing Sheets

INTERNAL EMI SHIELD FOR MULTIPLE ARRAY OPTOELECTRONIC DEVICES

RELATED APPLICATIONS

This application claims priority to U.S. patent application Ser. No. 09/956,771 filed on Sep. 20, 2001 entitled "Fiber Optic Transceiver, Connector, And Method of Dissipating Heat" by Johnny R. Brezina, et al., the entire disclosure of which is incorporated by reference, herein.

This application also relates to the following applications, filed concurrently herewith:

"Optical Alignment in A Fiber Optic Transceiver", by Johnny R. Brezina, et al. Ser. No. 10/007,027 filed Nov. 5, 2001;

"External EMI Shield For Multiple Array Optoelectronic Devices", by Johnny R. Brezina, et al. Ser. No. 10/006,644 filed Nov. 5, 2001;

"Packaging Architecture For A Multiple Array Transceiver Using A Continuous Flexible Circuit", by Johnny R. Brezina, et al. Ser. No. 10/007,026 filed Nov. 5, 2001;

"Flexible Cable Stiffener for An Optical Transceiver", by Johnny R. Brezina, et al. Ser. No. 10/007,028 filed Nov. 5, 2001;

"Enhanced Folded Flexible Cable Packaging for Use in Optical Transceivers, by Johnny R. Brezina, et al. Ser. No. 10/006,836 filed Nov. 5, 2001;

"Apparatus and Method for Controlling an Optical Transceiver", by Johnny R. Brezina, et al. Ser. No. 10/007,024 filed Nov. 5, 2001;

"Multiple Array Optoelectronic Connector with Integrated Latch", by Johnny R. Brezina, et al. Ser. No. 10/007,023 filed Nov. 5, 2001;

"Mounting a Lens Array in a Fiber Optic Transceiver", by Johnny R. Brezina, et al. Ser. No. 10/006,837 filed Nov. 5, 2001;

"Packaging Architecture for a Multiple Array Transceiver Using a Flexible Cable", by Johnny R. Brezina, et al. Ser. No. 10/006,835 filed Nov. 5, 2001;

"Packaging Architecture for a Multiple Array Transceiver Using a Flexible Cable and Stiffener for Customer Attachment", by Johnny R. Brezina, et al. Ser. No. 10/006,838 filed Nov. 5, 2001;

"Packaging Architecture for a Multiple Array Transceiver Using a Winged Flexible Cable for Optimal Wiring", by Johnny R. Brezina, et al. Ser. No. 10/006,839 filed Nov. 5, 2001; and "Horizontal Carrier Assembly for Multiple Array Optoelectronic Devices", by Johnny R. Brezina, et al. Ser. No. 10/007,215 filed Nov. 5, 2001."

TECHNICAL FIELD OF THE INVENTION

This invention is generally related to an internal shield for use in optoelectronic ports, and more particularly related to shields that prevent electromagnetic emissions from optical fiber link modules.

BACKGROUND OF THE INVENTION

Optical fiber is widely used to rapidly and reliably transfer data between computer systems. In general, an optical fiber includes a core region that is coated by an annular clad. The core region has an index of refraction greater than that of the clad, so that light is transmitted through the core by total internal refraction. Optical fibers transmit data from an optoelectronic transducer, such as a laser or Light Emitting Diode (LED), to an optoelectronic receiver that generates electrical information based upon the signal received.

Optical transceivers tend to generate electromagnetic interference (EMI) in the range of about 100 megahertz to 5 gigahertz, and this radiation is most likely to escape from the point at which the fiber is connected to the optoelectronic component. The fibers are typically either threaded onto the optoelectronic components or latched by the use of connectors such MTP or MTO connectors. Because these connectors are typically plastic, however, they are not effective EMI shields. In order to limit EMI, external shielding has therefore been provided in various forms. These shields have an opening that allows the connector to attach to the optoelectronic component. This opening is in effect an electromagnetic hole in the shield that allows EMI energy to escape.

SUMMARY OF THE INVENTION

The present invention is an optical fiber link module adapted to receive a fiber optic cable. The optical fiber link module comprises a multiple array lens and a female connector. The female connector is disposed around the multiple array lens, and has an internal cavity. An electromagnetic shield is disposed in the internal cavity, and has a single central aperture sized to permit communication by the multiple array lens through the central aperture.

It is an object of the present invention to provide an optical fiber link module of the type described above having an internal shield that inhibits EMI.

Another object of the present invention is to provide an optical fiber link module of the type described above that permits easy access to the connector and fiber cable by the end user.

Still another object of the present invention is to provide an optical fiber link module of the type described above that is cost effective.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION OF THE INVENTION

Figure 1:
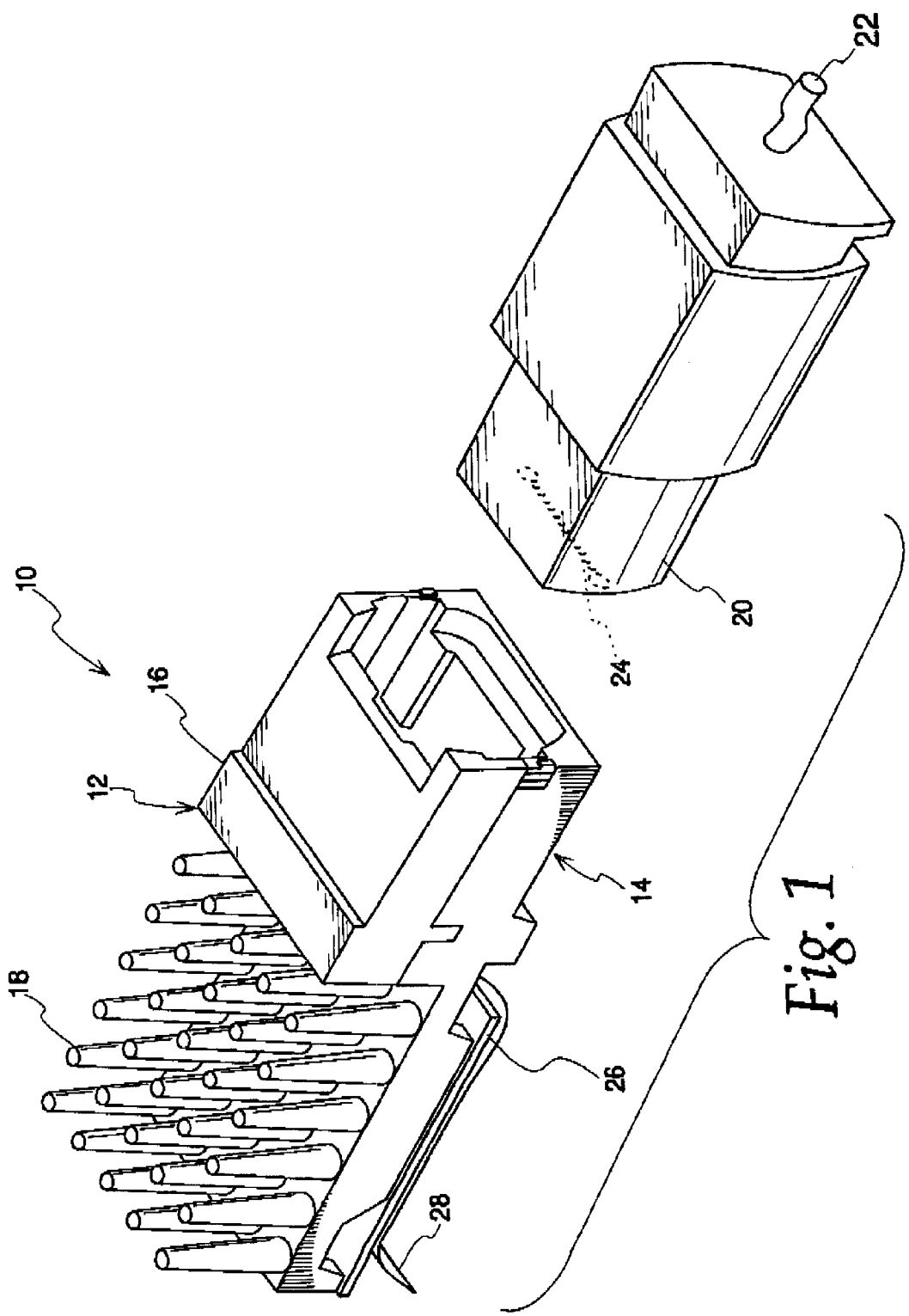
FIG. 1 is a perspective view showing an optical link module according to the present invention.
Figure 2:
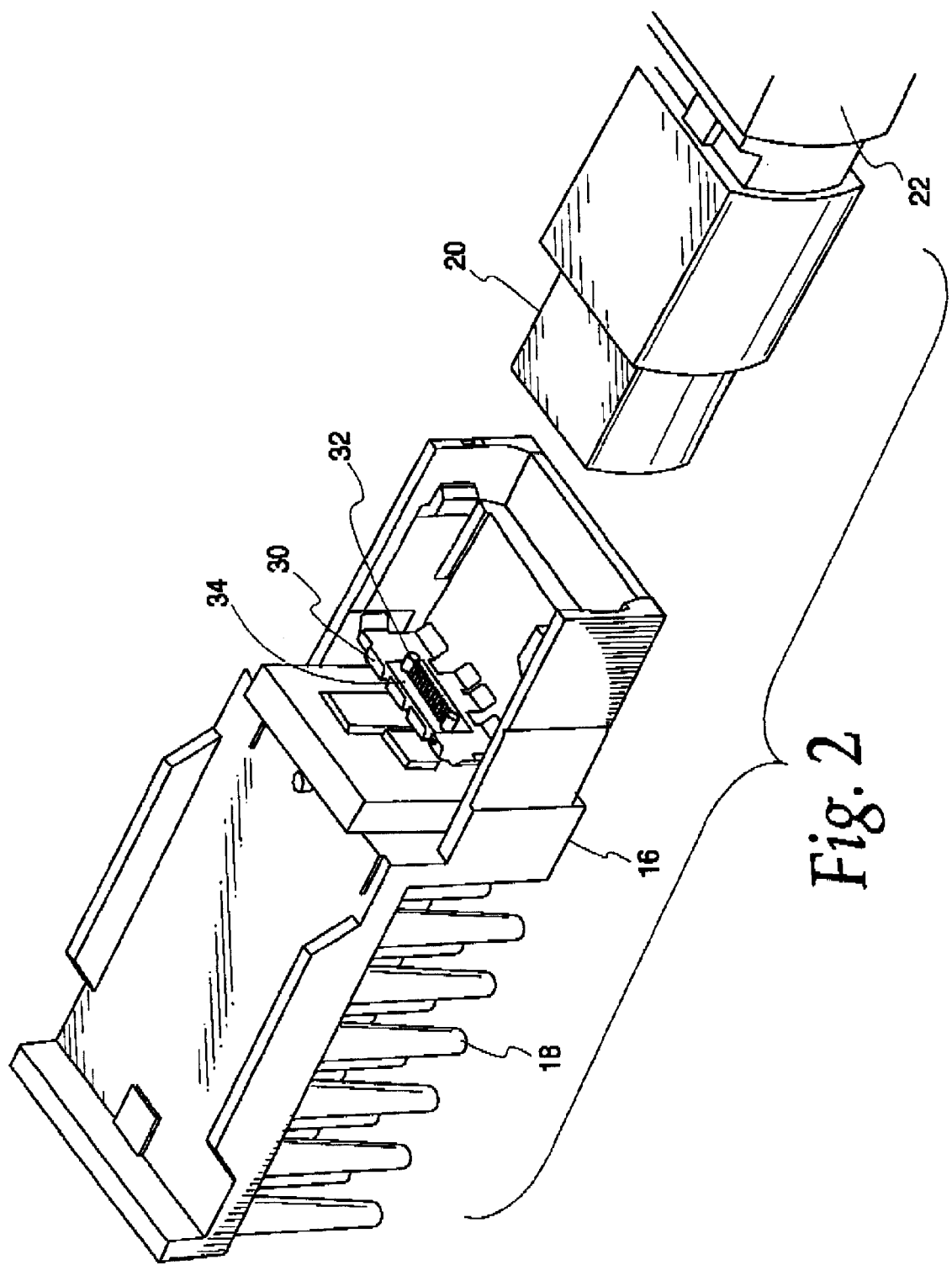
FIG. 2 is a perspective view of the underside of the optical link module with a cover, stiffener, and flexible circuit removed to shown an internal shield.

FIGS. 1 and 2 show the general configuration of an exemplary optical link module 10. Optical link module 10 represents a fiber optic communications package which is mounted within a component such as a router that transfers data to and from another component of the router or other computer systems such as network servers, mid-range computers, mainframe computers, work stations, desktop computers, portable computers, and the like.

The optical link module 10 generally includes an upper portion 12 and a lower portion 14. The upper portion 12 is preferably die cast as a single piece, and includes an upper connector 16 and a heat sink 18. The lower portion 14 of the module 10 is also preferably die cast from a relatively high thermal conductivity material such as aluminum, and may be joined to the upper portion 12 in any known fashion. Together, the upper connector 16 and the lower portion 14 form a female part of a standard MTP or MTO connector adapted to receive a male part 20 situated on the distal end of a fiber optic cable 22. In a preferred embodiment, the male end 20 of the fiber 22 includes a multiple array 24 similar to that shown in U.S. Pat. No. 5,499,311, the disclosure of which is hereby incorporated by reference.

An aluminum stiffener 26 is provided on the underside of the heat sink 18, with a flexible circuit 28 attached thereto. The flexible circuit may carry integrated circuit chips, resistors and other structure which operate to convert and route the fiber optic light signals from the fiber 22 to and from other areas of the router of which the module 10 is a part. Although the details of such conversion and routing are considered to be well within the level of ordinary skill in the art, further information is available in U.S. Pat. No. 6,085,006, the disclosure of which is hereby incorporated by reference. Normally, the module 10 receives serial electrical signals from a CPU, and an emitter (which may be an LED or laser) converts the serial electrical signal to a serial optical signal for transmission through the optical fiber 22. The module may also receive parallel electrical signals from the CPU, and convert the parallel electrical signal to a serial electrical signal that is provided to the emitter. The emitter in turn converts the serial electrical signal to a serial optical signal for transmission through the fiber 22. Similarly, incoming serial optical signals are converted by a receiver (which may be a photodiode) to a serial electrical signal. The serial electrical signal may be output to the CPU as a serial signal or converted to a parallel electrical signal and transmitted to the CPU. The emitter and the receiver may also transmit a parallel signal, in which case it is possible to omit the parallel to serial conversion or it may be possible to convert a serial electrical signal to a parallel signal for parallel optical transmission. In a preferred embodiment, signals are transmitted over the optical fibers at a frequency of about 2.5 gigahertz.

Unit 10 also retains an internal EMI shield 30 within an internal cavity formed by the upper connector 16 and the lower housing portion 14. The EMI shield 30 is located between the optical lens assembly 32 and the end of the removable connector housing 20. The major, planar section of the EMI shield 30 abuts a corresponding vertical surface of the upper connector 16, and may be secured thereto with an adhesive such as a silver epoxy. A series of vertically-and horizontally-disposed spring arms 33 are situated around the major planar surface of the EMI shield 30. When the EMI shield 30 is in place within the internal cavity formed by the upper connector 16 and the lower housing portion 14, the spring arms 33 hold the EMI shield in place by engaging the inner surfaces of the upper connector and of the lower housing portion.

The EMI shield 30 has an aperture 34 that aligns with the lens housing 32 to allow the light energy to pass through the EMI shield. The spring arms 33 are situated at a distance from the aperture 34 sufficient to avoid interfering with the mating of the male connector 20 and the lens housing 32. The internal shield 30 is preferably fabricated from a thin sheet of a metal possessing good EMI characteristics. Suitable materials for the shield 30 include gold, silver, and what is known in the art as nickel silver which is 59 percent by weight copper, 12 percent by weight nickel, and 29 percent by weight zinc. Sheets on the order of 0.2 mm in thickness provide suitable EMI characteristics.

The EMI shield 30 provides a barrier to any EMI radiation escaping from the interface of the array 24. To facilitate this end, the shield 30 is grounded to the upper connector 16, and thus to the heat sink 18. Because the heat sink 18 is in turn electrically grounded, either logically or to a chassis, the EMI energy is dissipated. At the same time, the aperture 34 in the shield allows the light energy to pass between the fiber optic components. The location of the shield 30 allows the removal of the male connector 20 without moving the shield out of position, and provides EMI shielding even while the male connector and cable 22 are removed. The present invention thus provides a relatively simple, low cost method of achieving EMI suppression for the optical device, while at the same time allowing accessibility and removability of the fiber optic connector and cable.

It should be appreciated that the internal EMI shield of the present invention can be implemented in a number of ways. Furthermore, the optical link module is also suitable for use in other communications systems or optical transmission networks, such as those used in telephone service. Various modifications may be made to the illustrated embodiments without departing from the spirit and scope of the invention. Therefore, the invention lies solely in the claims hereinafter appended.

What is claimed is:

1. An optical fiber link module comprising:

a multiple array lens;

a female connector disposed around the multiple array lens, the female connector having an internal cavity;

an electromagnetic shield disposed in the internal cavity, the electromagnetic shield having a single central aperture sized to permit communication by the multiple array lens through the central aperture; and an optical fiber adapted to be received by the female connector.

2. The optical fiber link module of claim 1 further comprising a heat sink in electrical communication with the female connector.

3. The optical fiber link module of claim 2 wherein the electromagnetic shield is in electrical communication with the female connector.

4. The optical fiber link module of claim 1 wherein the shield comprises a sheet of a metallic material.

5. The optical fiber link module of claim 4 wherein the metallic material is selected from the group consisting of gold, silver, copper, zinc and nickel or alloys thereof.

6. The optical fiber link module of claim 1 wherein the female connector comprises metal.

7. The optical fiber link module of claim 1 wherein the female connector comprises aluminum.

8. The optical fiber link module of claim 1 wherein the female connector comprises an upper portion and a lower portion.

9. The optical fiber link module of claim 1 wherein the fiber optic cable is removable from the female connector.

10. The optical fiber link module of claim 1 wherein the electromagnetic shield comprises a planar section and a plurality of spring arms disposed around the planar section.

11. The optical fiber link module of claim 1 further comprising a heat sink in electrical communication with the electromagnetic shield.

12. An optical fiber link module assembly, comprising:

a multiple array lens;

a female connector including an upper portion and a lower portion, the female connector being disposed around the multiple array lens, the female connector having an internal cavity;

a fiber optic cable adapted to be removably connected to the female connector; and an electromagnetic shield disposed in the internal cavity, the electromagnetic shield having a single central aperture sized to permit communication by the multiple array lens through the central aperture.

13. The optical fiber link module of claim 12 further comprising a heat sink in electrical communication with the female connector.

14. The optical fiber link module of claim 13 wherein the electromagnetic shield is in electrical communication with the female connector.

15. The optical fiber link module of claim 12 wherein the electromagnetic shield comprises a planar section and a plurality of spring arms disposed around the planar section.

16. The optical fiber link module of claim 12 further comprising a heat sink in electrical communication with the electromagnetic shield.

17. The optical fiber link module of claim 12 wherein the female connector comprises metal.

18. The optical fiber link module of claim 12 wherein the female connector comprises aluminum.

19. The optical fiber link module of claim 12 wherein the shield comprises a sheet of a metallic material.

20. An optical fiber link module comprising:

a multiple array lens;

a female connector disposed around the multiple array lens, the female connector having an internal cavity;

a heat sink in electrical communication with the female connector;

an electromagnetic shield disposed in the internal cavity in thermal communication with the female connector, the electromagnetic shield having a single central aperture sized to permit communication by the multiple array lens through the central aperture; and an optical fiber adapted to be received by the female connector.

* * * * *